United States Patent [19]

Shackleton et al.

[11] 3,936,902
[45] Feb. 10, 1976

[54] AUTOMATIC CLEANING APPARATUS FOR FLUID FILTERS

[75] Inventors: Michael Allen Shackleton, Edina; Roy Earl Anderson, Burnsville, both of Minn.

[73] Assignee: The United States Government as represented by the Secretary of the Army, Washington, D.C.

[22] Filed: July 11, 1974

[21] Appl. No.: 487,835

[52] U.S. Cl. ............................ 15/304; 15/345
[51] Int. Cl.² ............................ A47L 5/38
[58] Field of Search .......... 15/304, 316 R, 405, 406, 15/345; 55/294, 302

[56] References Cited
UNITED STATES PATENTS

| | | | |
|---|---|---|---|
| 2,242,901 | 5/1941 | Birch | 15/304 X |
| 2,591,198 | 4/1952 | Ringe | 15/304 X |
| 2,796,146 | 6/1957 | Hersey, Jr. et al. | 55/294 |
| 3,568,414 | 3/1971 | Spriggs et al. | 55/294 |
| 3,716,968 | 2/1973 | Mischke | 55/302 X |

*Primary Examiner*—Harvey C. Hornsby
*Assistant Examiner*—C. K. Moore
*Attorney, Agent, or Firm*—Robert P. Gibson; Nathan Edelberg; John E. McRae

[57] ABSTRACT

Apparatus to remove dust particles accumulating within the air cleaner of a vehicle engine, particularly an off-the-road vehicle of the military type. The apparatus includes a nozzle arranged to traverse the surface of the filter element within the cleaner, said nozzle being effective to blow or draw air through the pores of the filter element, thereby dislodging dust particles located on or in the filter element. The nozzle and filter element rotate relative to one another, whereby the nozzle traverses the entire peripheral dimension of the element; additionally the nozzle opening can be arranged to move in the direction of the filter element axis. By means of the combined axial and rotary movements the nozzle cleans the entire surface of the filter element.

3 Claims, 9 Drawing Figures

AUTOMATIC CLEANING APPARATUS FOR FLUID FILTERS

The invention described herein was made in the course of a contract between Donaldson Company Inc. and the U.S. Government. Devices embodying this invention may be manufactured or used by or for the Government without payment to the inventors of any royalties thereon.

BACKGROUND AND SUMMARY OF THE INVENTION

Automotive vehicle engines operate with combustion air that is drawn through an air cleaner located in the air intake system. The air cleaner commonly includes one or more sheets of porous material, such as paper, formed with multiple pleats. The pleated fabric is formed into a ring or cylinder. Engine vacuum draws air inwardly through the fabric cylinder, causing dust particles to be trapped on the outer surfaces of the fabric pleats.

Dust particle build-ups on the fabric surface increase the resistance to air flow. Eventually the fabric ring must either have the dust build-ups removed or the fabric ring replaced with a new fabric element.

Removal of dust build-ups is somewhat complicated by the pleated nature of the fabric. The pleats are usually relatively deep and close together to provide as much total surface area as possible. The closely spaced walls of the narrow crevices permit the dust particles to pack into the bottoms of the crevices, making subsequent dislodgement difficult. The present invention proposes a dust-dislodgement nozzle that operatively spans only a few of the crevices at any one moment, thereby enabling a given aerodynamic dislodgement force to be exerted on a relatively small area of the fabric. The nozzle is arranged to traverse the fabric ring in a combination of rotational and axial motions, sufficient to clean the entire fabric surface.

THE DRAWINGS

FIG. 1 fragmentarily illustrates a conventional fabric filter element.

Figure 9:
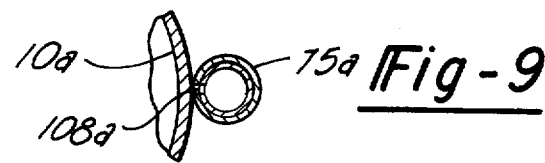
Figure 8:
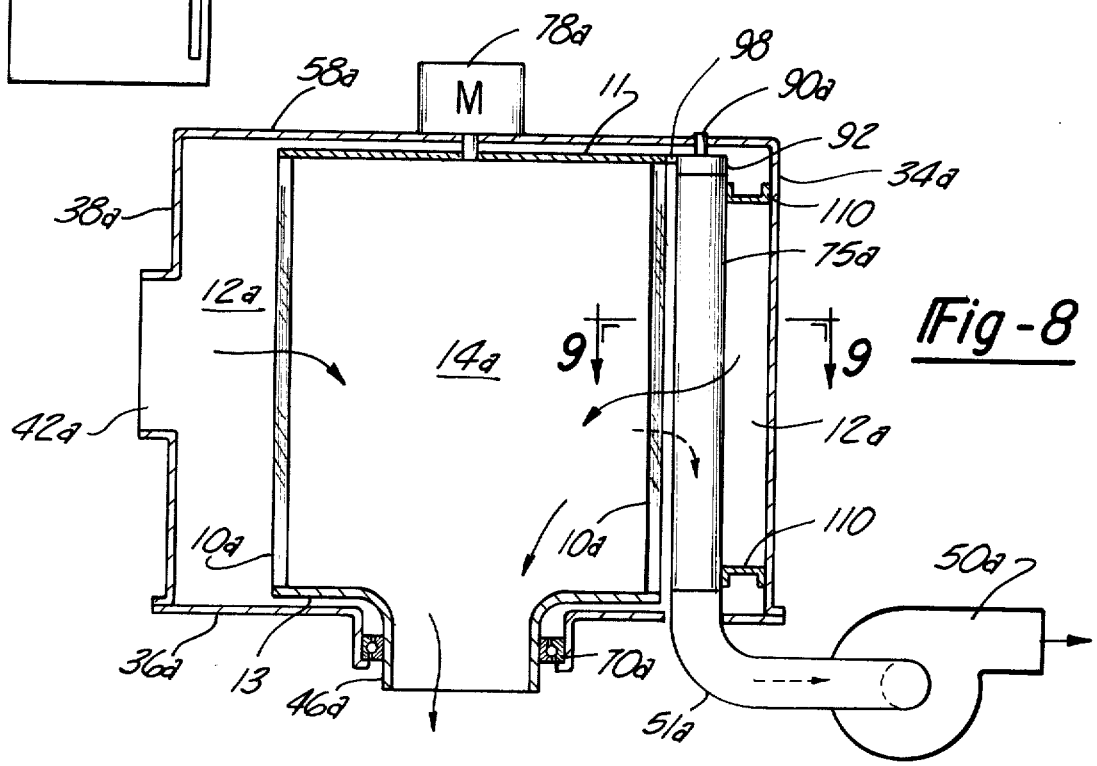

FIGS. 8 and 9 schematically illustrate another possible embodiment of the invention.

FIG. 1

Figure 1:
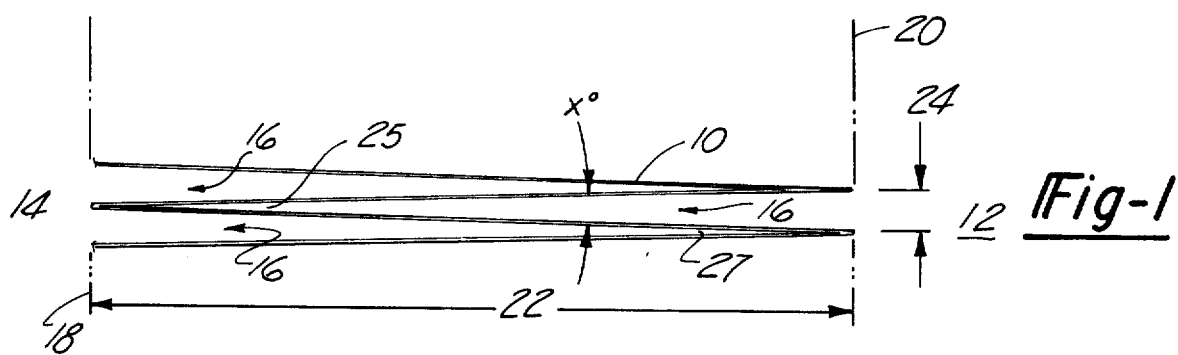

This FIG. fragementarily illustrates a pleated fabric filter element 10, formed for example of paper, to define an air inlet space 12 and an air outlet space 14. The engine cylinders communicate with space 14 to draw combustion air through the filter in the arrow 16 direction. FIG. 1 shows approximately two or three pleats; the complete filter element is an endless ring usually having 200 or more pleats extending from the ring inner perimeter 18 to the ring outer perimeter 20. The pleat walls are therefore relatively closely spaced together, particularly at the apex of each pleat near perimeter 18. Ordinarily the outer diameter of the filter element ring (defined by outer perimeter 20) is approximately twelve inches, and the inner diameter of the filter element ring (defined by inner perimeter 18) is approximately eight inches, providing a pleat depth dimension 22 of about 2 inches. Assuming 200 pleats in the entire filter element, each pleat would have an entrance mouth dimension 24 of about 0.2 inches; the pleat walls would converge toward each other at a total included angle $x$ of approximately 5° or less.

During Figure the dust particles appear to collect predominately near the apex of each pleat near inner perimeter 18. Apparently the relatively slight angle $x$, together with the small mouth dimension 24, allows the pleat walls to guide the dust particles into the narrowest portion 25 of the V-shaped crevice. Inertial effects contribute to an undesired packing in zone 25. Examination of filters after a period of service indicates that the outer area of each pleat (near perimeter 20) is visibly cleaner than the inner area (near perimeter 18).

The pleated nature of the filter element poses a problem when it is desired to automatically dislodge accumulated dust particles by reverse air cleaning procedures, either forced air or vacuum. Thus, assuming that an instrumentality is available for forced air cleaning in the reverse direction, i.e. from inner perimeter 18 toward outer perimeter 20, then the cleaning air tends to move along the inner surfaces of the pleat walls to collect in the crevice apex areas 27 near outer perimeter 20; apparently the pleat walls act as deflectors for the cleaning air, thereby preventing the cleaning air from most effectively dislodging the dust particles on the outer surfaces of the pleat walls. However, it is believed that if a relatively large volume of relatively low pressure air is used in the reverse air cleaning operation then the air pressure tends to equalize along the inner surfaces of the pleat walls from the outer apex area of each crevice (at perimeter 20) toward the inner mouth area (at perimeter 18); the equalized pressure presumably has an enhanced capability for disloging dust build-ups on wall areas near inner perimeter 18. In practicing the present invention, it is proposed to use forced draft reverse air cleaning procedures with relatively low supply air pressures i.e. lower than the 60-80 p.s.i. that one usually has in mind when referring to "compressed air". The desired "low pressure" is however not less than 2 p.s.i. The desired low air pressures apparently facilitate pressure equalization along the depth of each crevice, hence better overall cleaning of the inner mouth wall area. The present invention is believed usable on the basis of forced draft reverse air cleaning concepts or induced draft (vacuum) reverse air cleaning concepts. In either case, the use of a moderate pressure differential across the fabric wall is preferred.

The large number of pleats in a conventional filter element tends to prevent reverse air cleaning of the entire element surface in a single operation or setting of the cleaning apparatus. The areas less clogged with dust particles tend to form air channels that bypass the flushing air around the more heavily clogged areas, thus preventing complete cleaning of the entire filter element surface. It is proposed to employ a reverse air cleaning apparatus that utilizes an air nozzle having a port area substantially less than the filter element area. The nozzle is arranged for rotational movement relative to the adjacent perimeterical surface of the filter element; additionally the nozzle opening may be arranged for axial movement relative to the filter element. By means of a combination of rotational and axial motions the nozzle is enabled to effectively clean the entire surface of the filter element.

FIG. 2

This Figure illustrates an engine air cleaner embodying the invention. An annular ring-like filter element 10, having pleats of the type shown in FIG. 1, is mounted between a stationary annular surface 30 and a stationary annular surface 32. Surface 32 forms part of a can-like cover 34 arranged to be clamped on the base structure 36 by means of two or more toggle clamps, not shown, carried on the outer faces of the cover side wall 38.

Outside air is drawn into the annular space 12 through an air-supply passage 42. After passing through the annular filter element 10 the cleaned air moves from inner core space 14 through passage 46 to the engine.

Figure 7:
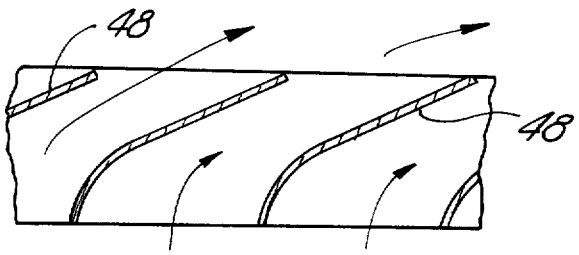

In order to reduce dust build-ups on the pleated surfaces of filter element 10 the illustrated air cleaner is provided with a centrifugal pre-cleaner. The precleaner consists of mechanism for applying centrifugal force components to the air entering space 12, and an induced draft fan for removing the larger dust particles that are thrown outwardly toward side wall 38 by the centrifugal forces. FIG. 7 illustrates the centrifugal force means as comprising a series of vanes 48 having surfaces angled in a circumferential direction. The vanes are evenly spaced around the periphery of the air cleaner to direct all of the incoming air in the circumferential direction, as denoted by the arrows in FIG. 7. Preferably the vanes are secured to cover 34, although they can be secured to base 36 if desired.

The circumferentially-moving nature of the air stream in space 12 causes the larger dust particles to be centrifugally thrown outwardly toward wall 38; the smaller and lighter dust particles are less affected by centrifugal force, hence less heavily concentrated near wall 38. A small induced draft fan 50 may be connected to space 12 to draw particle-enriched gas from the space nearest wall 38. Fan 50 is sized to draw off only a minor fraction of the fluid supplied to space 12. For example, assuming the engine vacuum pulls 1,100 c.f.m. into space 12, then fan 50 might be sized to draw off approximately 100 c.f.m.; the remaining 1,000 c.f.m. is drawn into the engine. Fan 50 preferably operates whenever the engine is running.

Periodically dust build-ups on the outer surfaces of the pleated walls in filter annulus 10 may be blown outwardly toward wall 38 by the forced air-cleaning apparatus shown at 52. The apparatus comprises a compressed air source 54 supplying pressurized air to a tube 56 affixed to cover end wall 58. Surrounding tube 56 is a rotary tube 60 having a tapered section 62 leading to an outwardly radiating tube section 64. Suitable bearings 66, 68 and 70 are provided between the rotary tube and the immovable structures 56 and 72.

Tube section 64 connects with one end of an axially-extending tubular mask 74, whose other end is suitably affixed to a radial arm 76 carried by tube 60. Tubular mask 74 constitutes part of a nozzle structure 75 which directs pressurized air outwardly through filter annulus 10 to effect a reverse air cleaning operation on the dust accumulations. The entire assembly, comprising tube 60, tube section 64, and tubular mask 74, is capable of rotation as a unit around the central axis of the air cleaner. The nozzle structure is thereby enabled to traverse the entire inner perimeter 18 of the filter annulus.

Rotary movement of tube 60 and the associated structure may be accomplished by means of an electric motor 78 mounted on a spider 80 suitably affixed to tube 56. The output shaft 82 of the motor is affixed to a second spider 84 carried by tube 60. Energization of the motor may be on a periodic or timed basis, spaced according to when it is necessary for the nozzle structure to remove dust accumulations from the filter annulus. Dust blown off the filter element by the nozzle reaches wall 38 where it is entrained in the circumferentially-moving stream exhausted through port 51 by the small fan 50. Circumferential swirl due to vanes 48 assists in moving the particles toward port 51.

FIGS. 3 THROUGH 6

Figure 2:
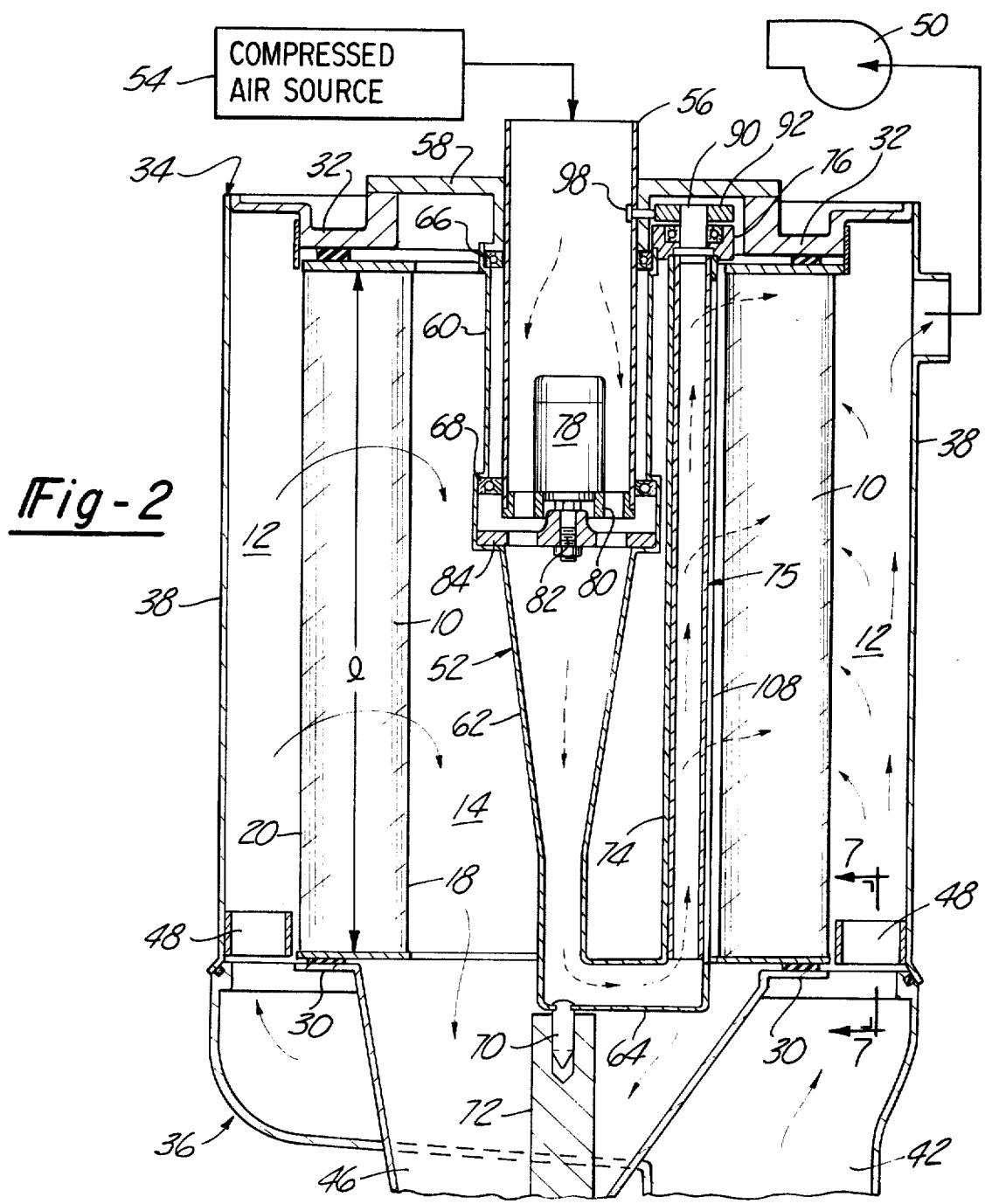
FIG. 2 is a sectional view taken through an engine air cleaner embodying the present invention.

These Figures illustrate the construction of the reverse air-cleaning nozzle structure 75 used in the FIG. 2 air cleaner. In general, the nozzle structure comprises a tube-in-tube unit wherein the outer tube has a slot extending its full length, i.e. the axial dimension *l* of the filter annulus. The inner tube has a number of shorter slots or ports located at different points around its circumference; the shorter slots are located at axially spaced points along the inner tube so that rotational adjustment of the inner tube causes different ones of the shorter slots to register with the full length slot in the outer tube; the outer tube functions as a mask to block selected ones of the ports. As the nozzle structure traverses the inner perimeter of the filter annulus the exposed slot in the inner tube will discharge pressurized air through the filter at the corresponding radial plane. At conclusion of one revolutional traverse the inner tube is indexed to place a different one of the short slots in registry with the full length slot in the outer tube. During the next revolution the newly registered slot will discharge pressurized air through the filter at a new radial plane. By a number of such orbital traverses around the inner perimeter of the annulus it is possible to clean the entire surface of the annulus.

Figure 3:
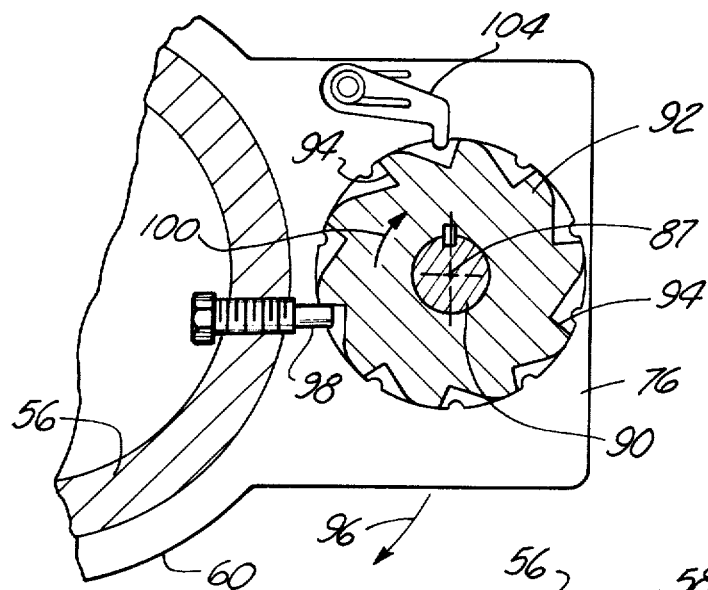
FIGS. 3, 4, 5 and 7 are enlarged fragmentary views illustrating constructional details used in the FIG. 2 apparatus.
Figure 4:
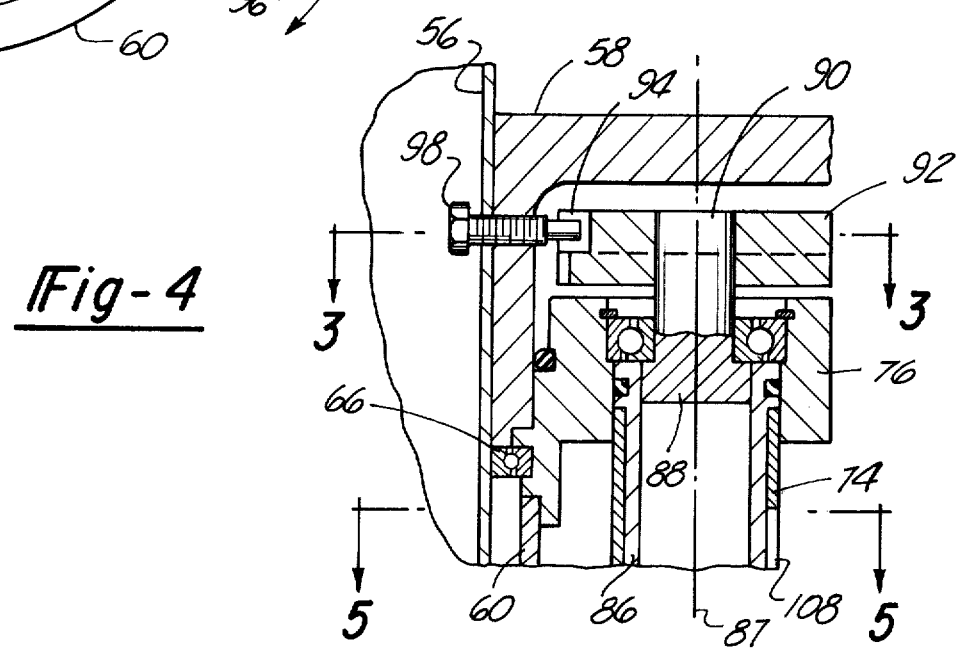

Referring more particularly to FIG. 4, the nozzle structure will be seen to comprise the aforementioned masking tube 74 and a second inner tube 86 rotatably adjustable about the tube axis 87. As shown in FIG. 4, tube 86 is closed by means of a plug 88 having a stub-shaft extension 90 affixed to an indexing disc 92. The disc is formed with ten notches that form ten teeth 94. As the nozzle structure moves around the inner perimeter of the filter annulus in the arrow 96 direction (FIG. 3) one of the teeth strikes a driver pin 98 carried by stationary tube 56; disc 92 is thereby forced to move relative to arm 76 in the arrow 100 direction, i.e. around the nozzle structure axis 87. A spring-urged detent 104 limits the arrow 100 movement to a precise one tooth distance. During the arrow 100 movement the detent rides on the outer surface of disc 92.

Figure 6:
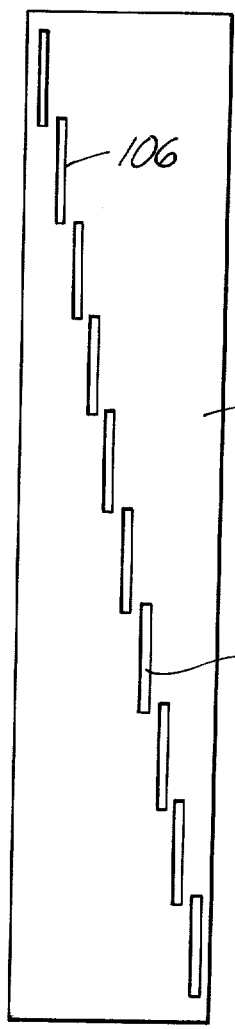
FIG. 6 shows a nozzle-forming tube used in the FIG. 2 apparatus unfolded to the "flat sheet" stage to show a preferred port arrangement.

FIG. 6 shows tube 86 unfolded to a flat sheet form to illustrate ten slots or ports 106 formed at staggered locations along its length. The illustrated ports are staggered in the lateral direction (corresponding to the circumferential direction when the sheet is formed into the tube shape). The number of slots 106 corresponds to the number of teeth 94, such that each orbital movement of the nozzle structure around the inner perimeter of the filter annulus causes pin 98 to index disc 92 and tube 86 into a new position wherein a new slot 106 registers with a full length slot 108 formed in outer masking tube 74.

Figure 5:
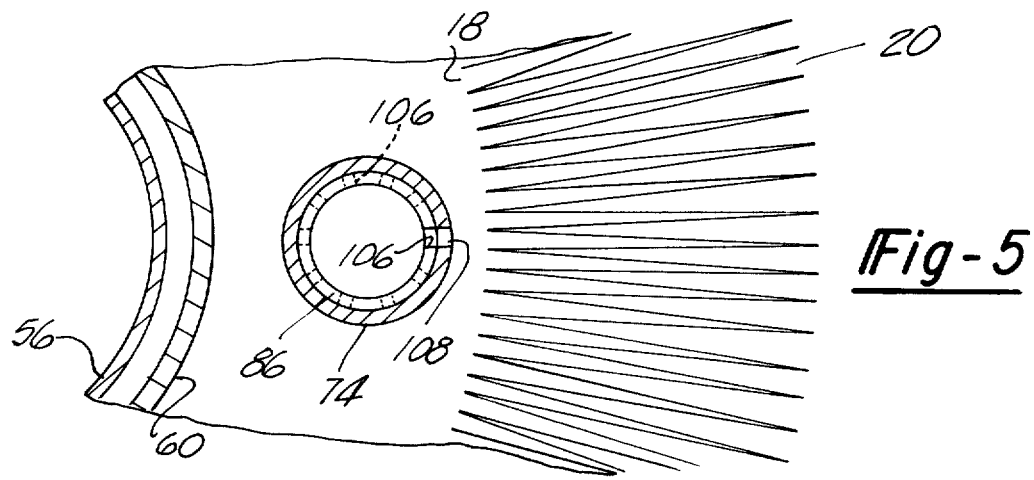

As best seen in FIG. 5, slot 108 is at the tube surface facing the pleated fabric filter annulus. Therefore, pressurized air is discharged from the interior of tube 86 through registering slots 106 and 108 against the fabric surface. Rate of movement of the nozzle structure along the filter element perimeter is preferably such that pressurized air fills each V-shaped cavity, thereby developing satisfactory aerodynamic dust-dislodgement force on the pleat apex at perimeter 18 where the major portion of the dust build-up is located.

The use of a tube-in-tube nozzle structure is most advantageous where the filter annulus has a relatively large axial dimension *l*, e.g. sixteen inches. In such structures the use of a single tube having a full length slot would not provide satisfactory cleaning along the entire length of the annulus; certain portions of the tube would receive greater percentages of the pressurized air than other portions. By using a tube-in-tube unit it is possible to provide a relatively short nozzle opening 106 during each revolution of the nozzle structure, hence less localized air starvation tendency and better coverage of the filter surface in radial alignment with the port. The indexing action (FIG. 3) enables the various ports 106 to be sequentially effective for directing air in different radial planes. Outer tube 74 functions as a mask to cover all ports 106 except the one being used at the moment. Mechanisms other than the tube-in-tube could also be used to accomplish movement of the nozzle opening 106 in the axial direction.

The rate of movement of the nozzle structure along perimeter 18 is perhaps best determined by actual testing with the particular filter being used; variables might include such parameters as the diameter of the filter annulus, the number of pleats, the filter material, the cleaning air pressure, the dimensions of the slots 106, etc. In a filter having an inner diameter of approximately 7 and ½ inches, an axial length of sixteen inches, and a total of 308 pleats, satisfactory cleaning was achieved using a motor 78 that produced 1 revolution of the nozzle structure in approximately 9 seconds; the nozzle structure comprised a tube-in-tube unit having one full length slot in the outer tube and 10 short slots in the inner tube.

THE CONTROL SYSTEM

Under normal circumstances it may not be necessary or desirable that reverse air cleaning of the filter surface take place continuously. Instead it may be sufficient that cleaning occur on a periodic basis, as by using a timer, or on a pluggage-accumulation basis. In the latter event the cleaning mechanism power means (motor 78 and air compressor 54) may be energized for a predetermined time period only when the filter annulus is sufficiently plugged to warrant cleaning; such plugging can be detected by a conventional differential pressure switch responding to static pressures upstream and downstream of the filter annulus. The control system could include such a pressure switch, together with a suitable time delay means, sufficient to continue energization of the cleaning mechanism until the filter was substantially restored to an unplugged condition. In one instance the time delay means was selected to provide an energization time on the order of 4 minutes, equivalent to three passes of the nozzle structure over the filter (thirty revolutions of motor 78). During most engine-operating periods the cleaning mechanism is in a deenergized condition. For example, the mechanism might be energized for four minutes; then de-energized for 2 hours, then energized again for 4 minutes, etc., all in accordance with the rate at which the filter accumulates dust from the atmospheric air being drawn into the engine.

FIG. 8

Previous discussion has centered to a certain extent on problems associated with removal of dust build-ups on pleated fabric filters. However, it is believed that the invention could be applied to air cleaners having non-pleated filter elements. FIG. 2 illustrates an embodiment of the invention using forced draft reverse air cleaning; however it is believed that the invention could probably use induced draft type reverse air cleaning structures. FIG. 8 schematically illustrates one form of the invention utilizing a non-pleated filter annulus cleaned by an induced draft cleaning apparatus.

In the FIG. 8 apparatus the filter annulus 10a is suitably affixed to an upper disc 11 and a lower disc 13; the lower disc includes a tube-like extension 46a that directs cleaned air to the engine. The above assembly is suitably mounted for rotation on a stationary base 36a, as by means of bearings 70a. An electric motor 78a is arranged on the end wall 58a of a can-like cover 34a to impart rotation to disc 11, hence to the filter annulus 10a. Cover 34a includes an annular side wall 38a having an air-admission opening 42a. It will be appreciated that the engine draws air through opening 42a into outer annular space 12a, thence through the filter annulus into core space 14a, and finally into the engine.

Periodic cleaning of the outer surface of filter annulus 10a may be accomplished by means of a small induced draft fan (blower) 50a connected to a nozzle structure 75a via a tube 51a. The nozzle structure may be mounted in a fixed location between walls 58a and 36a; it may be a tube-in-tube unit similar to the unit used in the FIG. 2 construction. As such, it is provided with an indexing means 92 driven by means of a driver pin 98 carried by the rotary disc 11.

Operation of the FIG. 8 apparatus during the filter cleaning mode involves energization of motor 78a to rotate the filter annulus, and energization of blower 50a to draw air from space 14a through the filter annulus. As the filter annulus moves past the stationary nozzle structure 75a the filter areas registering with the nozzle are cleaned in a fashion generally similar to that previously described. The indexing means 92 may be actuated by pin 98 after each revolution of the filter annulus, to thereby rotationally adjust the inner tube of the tube-in-tube unit to a position suitable for cleaning the next axial section of the filter.

It will be noted from FIG. 9 that due to the non-pleated nature of the filter element the nozzle is located very close to the filter element surface; additionally there are no V-shaped cavities that tend to cause tight packing of the dust particles. These factors tend to make the cleaning operation somewhat easier. However, the non-pleated filter has substantially less total face area than the pleated filter so that linear velocities during the normal run periods are appreciably higher. For a given filter element porosity the non-pleated filter may not collect as efficiently as the pleated filter. Additionally, the dust cake thickness may build up more rapidly with the non-pleated filter, thereby requiring cleaning at closer time intervals or possibly on a continuous basis. FIG. 2 represents a preferred construction. FIG. 8 merely illustrates one alternate form that might prove acceptable for certain engines or applications.

The drawings show nozzle structures of the tube-in-tube type for successively cleaning different axial sections of a filter annulus in a predetermined program comprised of a number of revolutions of the nozzle (FIG. 2) or the filter annulus (FIG. 8). If the filter annulus has a relatively small axial dimension $l$ then it may be possible to use a nozzle comprised of a single tube having a single slot or single row of openings therein; cleaning would thus be accomplished in one revolution of the nozzle or filter element.

Whatever the structure of the cleaning apparatus, it is preferred to mount as much of the apparatus as possible on cover 58 or 58a. In the FIG. 2 construction the rotary nozzle structure is mounted primarily on tube 56 that joins cover 58. Bearing 70 functions as a centering device to prevent undue stress on the rotary mechanism. The rotary mechanism is removable with the cover to expose the filter annulus when it becomes necessary to replace the filter element or service the motor, etc. The schematically illustrated structure shown in FIG. 8 lacks the filter element access feature possessed by the FIG. 2 structure. However, FIG. 8 is largely schematic; it would be possible to provide easy access features in the actual structure. Nozzle structure 75a would preferably be affixed or otherwise mounted on the cover, as for example by means of brackets 110.

We wish it to be understood that we do not desire to be limited to the exact details of construction shown and decribed, for obvious modifications will occur to a person skilled in the art.

We claim:

1. In a dust removal apparatus comprising an annular filter element having an axial length "$l$"; a tubular air flow nozzle structure extending along and closely adjacent to a perimeter surface of the filter element for the full axial length $l$; said nozzle structure comprising a port forming means facing the perimeter surface of the filter element, said port forming means having an axial dimension substantially less than the filter element length $l$; means to move flushing air through the nozzle structure so that the port forming means removes dust build-ups from the filter element; first means to move the port forming means in a direction parallel to the filter element axis; and second means to move the port forming means circumferentially around the filter element surface:

the improvement wherein the second moving means operates continuously to produce a relatively slow uninterrupted circumferential motion of the port forming means, and the first moving means operates only at the end of each complete revolution of the port forming means to produce a relatively quick step-like axial indexing of said port forming means.

2. In the apparatus of claim 1 said first moving means comprising a toothed disc carried by the nozzle structure, and a cooperating disc driver member carried by the filter element; said driver member being arranged to sweep through the space occupied by one of the disc teeth as the filter element completes 1 revolution, thereby producing a predetermined movement of the disc.

3. In the apparatus of claim 2 said nozzle structure comprising two concentric tubes; one of said tubes having a full length flow slot facing the perimeter surface of the filter element, and the other tube having a series of flow openings spaced circumferentially and axially therealong in spiral fashion; said slot and said openings comprising said port forming means said other tube being rotatable relative to said one tube to cause different ones of the flow openings to register with the flow slot; said toothed disc being affixed to said other tube to produce the necessary tube rotation.

* * * * *